United States Patent [19]
Chiang et al.

[11] Patent Number: 5,233,281
[45] Date of Patent: Aug. 3, 1993

[54] REPLACEABLE CARTRIDGE TYPE HIGH SPEED NICKEL-CADMIUM BATTERY CHARGER

[75] Inventors: Wen-Chi Chiang; Ming-Kang Yu; Kan-Chuan Su; Yen-Chien Jiang, all of 2F-1, No. 190, Sec. 2, Kellung Rd., Taipei, Taiwan

[73] Assignees: Wen-Chi Chiang; Deh-Chun Lee; Kan-Chuan Su; Yen-Chien Jiang, all of Taipei, Taiwan

[21] Appl. No.: 800,991

[22] Filed: Dec. 2, 1991

[51] Int. Cl.$^5$ .............................................. H02J 7/00
[52] U.S. Cl. ......................................... 320/2; 320/15; 320/20
[58] Field of Search .................. 320/2, 5, 6, 15, 17, 320/18, 20, 21, 22, 23, 24, 39, 40; 455/89, 90

[56] References Cited

U.S. PATENT DOCUMENTS

| | | | |
|---|---|---|---|
| 4,303,876 | 12/1981 | Kelly, III et al. | 320/5 X |
| 4,558,270 | 12/1985 | Liautaud et al. | 320/2 |
| 4,636,703 | 1/1987 | Tohya et al. | 320/15 X |
| 4,746,854 | 5/1988 | Baker et al. | 320/20 X |
| 4,769,977 | 8/1988 | Fasen et al. | 320/39 X |
| 4,779,035 | 10/1988 | Engelmann | 320/20 X |
| 4,873,479 | 10/1989 | Iimura et al. | 320/2 |
| 5,065,082 | 11/1991 | Fushiya | 320/2 |

FOREIGN PATENT DOCUMENTS 0295139  4/1990  Japan ................................ 320/2

Primary Examiner—Steven L. Stephan
Assistant Examiner—Kristine Peckman
Attorney, Agent, or Firm—Bacon & Thomas

[57] ABSTRACT

A replaceable cartridge type high speed nickel-cadmium battery charger comprising a base, a circuit board, an upper cover, and a replaceable charger cartridge, in which the base has a hollow interior space and a round hole in the middle; the circuit board with circuits on it is assembled within the hollow interior space of the base; the upper cover has a plurality of convectional radiation holes on the left side of its upper surface, a LED indicator at its left edge, and a replaceable charger cartridge chamber on the right side; and the replaceable charger cartridge has a battery chamber, two conductive metal plates at the front side and a lock hole on the bottom so as it can be placed in and removed from the charger cartridge chamber, and locked to the base by means of a bolt passing through the round hole in the middle of the base to the lock hole.

8 Claims, 4 Drawing Sheets

REPLACEABLE CARTRIDGE TYPE HIGH SPEED NICKEL-CADMIUM BATTERY CHARGER

BACKGROUND OF THE INVENTION

The present invention relates to a battery charger, particularly a replaceable cartridge type high speed nickel-cadmium battery charger.

Conventionally, a nickel-cadmium battery charger is generally provided by manufacturers as standard or optional accessory. In the world today, there is an increasing number of electric devices using nickel-cadmium batteries, such as electric hand tools, photo cameras, video cameras, lighting fixtures, mobile phones, radio equipment, notebook computers, and many others For convenience, rechargeable batteries are often used as a power source. As the use of such batteries in our daily life is becoming more and more common, charging of rechargeable batteries and reliability of charging units are very important. However, as leisure time in living nowadays is very tight, there is a tendency that the shorter the time of charging, the better. With modern technology, it is not difficult to produce a battery charger which can completely charge a battery within one hour or even half an hour. However, precautions should be taken in charging of batteries because improper charging can shorten the service life of a battery. Hence, there is a need for improvement of charging technology.

Moreover, because of price competition, most battery chargers accompanying such devices comprise low-speed chargers or simple chargers, none of them being satisfactory in both time required for charging and adequate in service life of the battery. Therefore, consumers have a need for a high-speed charger of a second charger so that they can have one charger at home and another at an office.

The design and production of an outstanding battery charger does not only benefit general consumers, but the economics of the nation as well. Moreover, a charger which can be used with different size/configurations of rechargeable batteries as used in different electric devices is preferable, both from an economic view point for convenience of using. Such a design, if successful, will minimize consumption of money and natural resources.

The aforesaid design can provide additional value to electric devices, and make them more competitive in the international market. Moreover, a charger which can be used for different rechargeable batteries can minimize stock requirements for electric device dealers, and can provide consumers with a versatile charger at a competitive price.

SUMMARY OF THE INVENTION

In view of the above, problems associated with the prior art, the inventor has created a replaceable cartridge type high speed nickel-cadmium battery charger after repeated testing and experiments. Such a battery charger has the following merits:

(1) Replaceable charger cartridges to fit batteries of different sizes/configurations for different electric devices.

(2) Both a.c. and d.c. are applicable: AC 220V, or AC 110V, or DC 12V.

(3) High speed charging, charging can be completed within a half hour.

(4) Three-color indicator: Orange as waiting, red as charging in process, and green as battery is ready for use.

(5) Automatic discharging to erase memory of voltage for last battery charged.

(6) Automatic discrimination for charging condition to cut off power source automatically in order to prevent overcharging which may damage battery.

(7) Includes different protection circuits, including short-circuit, overload, and overheating.

(8) Unique switching type charging circuit which provides high efficiency and low heat emission.

(9) Application of SMT technology for light and compact size with high reliability at high production capacity.

(10) No microprocessor is used for discrimination, eliminating erroneous functions which may occur to damage battery.

(11) Twin d.c. power source sockets to fit plug of different specifications.

(12) Light and compact, with elegant appearance.

BRIEF DESCRIPTION OF THE DRAWINGS

These and other objects and features of the invention will become more apparent from the following description taken in connection with the accompanying drawings wherein.

DESCRIPTION OF THE PREFERRED EMBODIMENT

Figure 1:
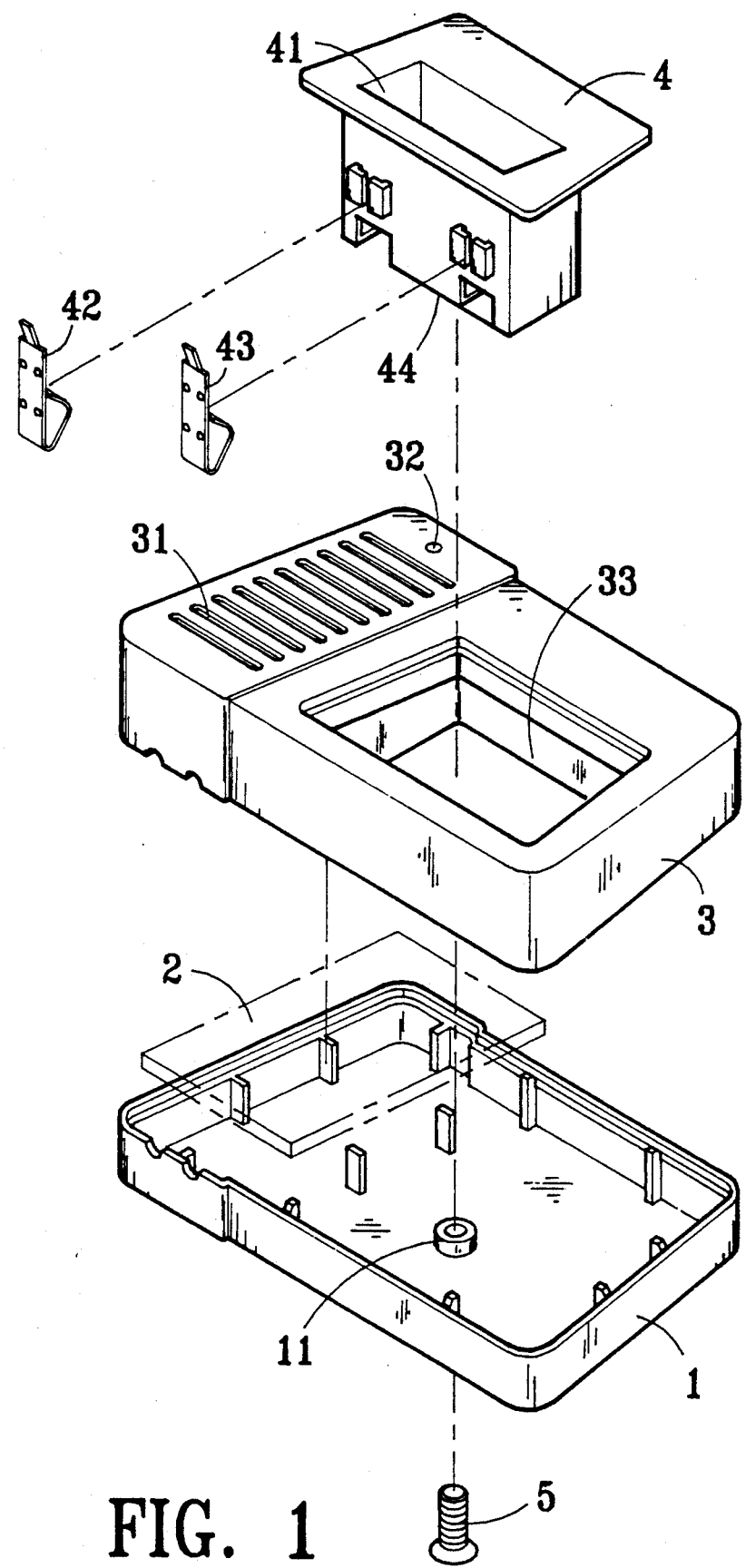
FIG. 1 is a perspective fragmental view of a replaceable cartridge type high speed battery charger according to the present invention.
Figure 2:
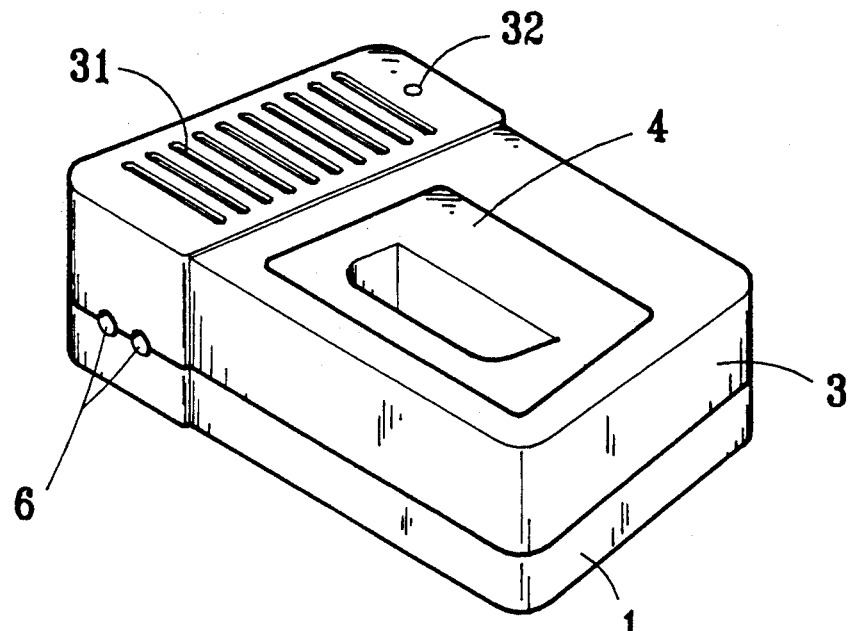
FIG. 2 is a perspective view of the replaceable cartridge type high speed battery charger according to the present invention.
Figure 6:
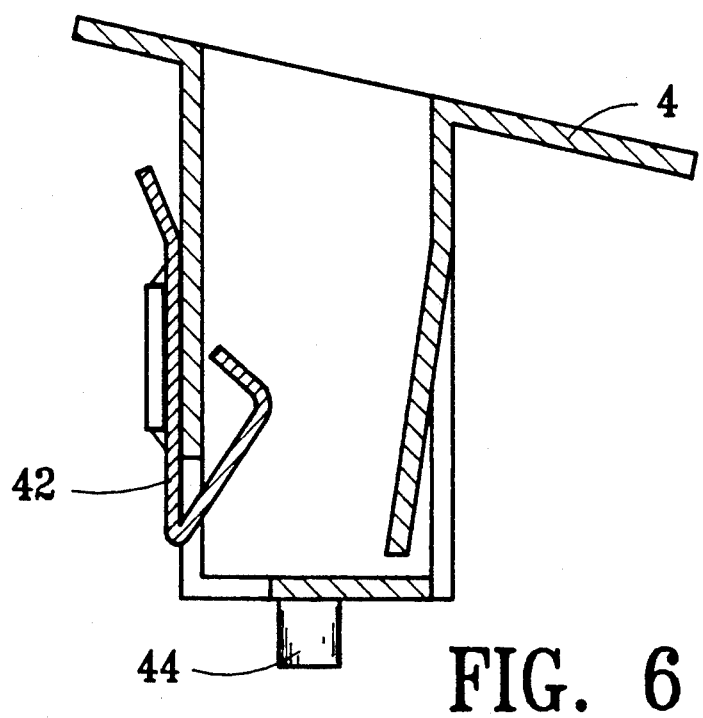
FIG. 6 is a cross-sectional side view of the replaceable charging cartridge shown in FIG. 1.

Please refer to FIGS. 1 and 6 which depict a perspective fragmental view of a replaceable cartridge type high sped nickel-cadmium battery charger and a cross-sectional view of a replaceable charging cartridge according to the present invention respectively, the charger includes a base (1) having a hollow interior space for holding of a circuit board (2) and covered by an upper cover (3). The upper cover (3) has a plurality of convectional radiation holes (31) on the left side of its upper surface, a LED indicator (32) at its left edge, and a replaceable charger cartridge chamber (33) where a replaceable charger cartridge (4) can be inserted or removed from. The charger cartridge (4) can be dimensioned to fit a rechargeable battery for a mobile phone, radio communication equipment, a video camera, and the like to meet individual needs. Within the charger cartridge (4) there is a battery chamber (41) to hold one or more rechargeable batteries. Two conductive metal plates (42 and 43) are fixed at the front side of the charger cartridge (4) for connection between the battery to be charged and a charger circuit for charging purposes. A lock hole (44) is designed on the bottom of the charger cartridge (4) so that the charger cartridge (4) can be locked to the base (1) by means of a bolt (5) passing through a round hole (11) in the middle of the base (1) and into the lock hole (44) so as to become a replaceable cartridge type high speed nickel-cadmium battery charger as shown in FIG. 2.

Figure 3:
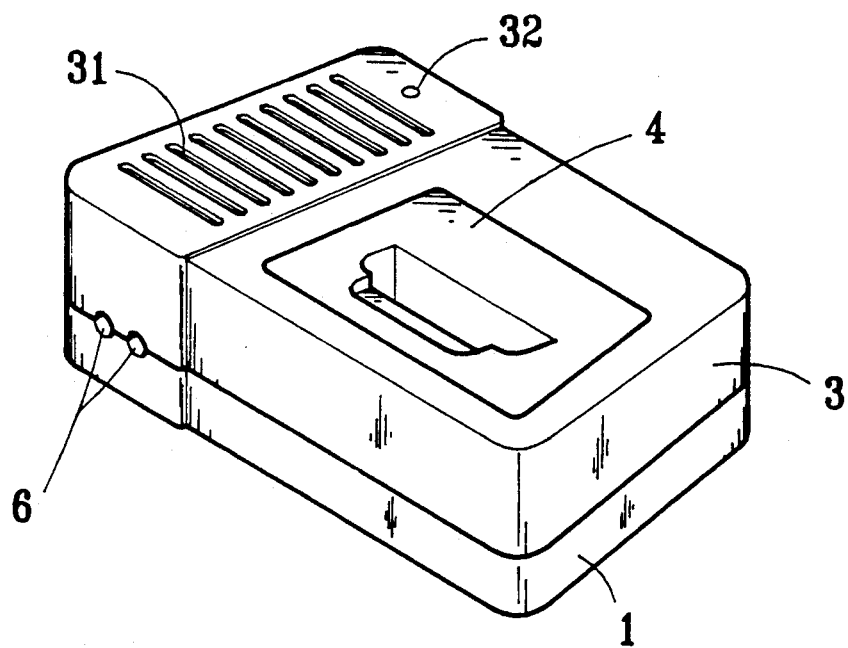
FIG. 3 illustrates a charger cartridge for another type of rechargeable battery.

On the front side of the charger a pair of d.c. power sockets (6) are located to fit different power source adapters which permit application of an a.c. power source for charging. If a d.c. power source is applied, the d.c. power source is connected to the socket (6) directly. FIG. 3 illustrates a charger cartridge for another type of rechargeable battery.

Figure 4:
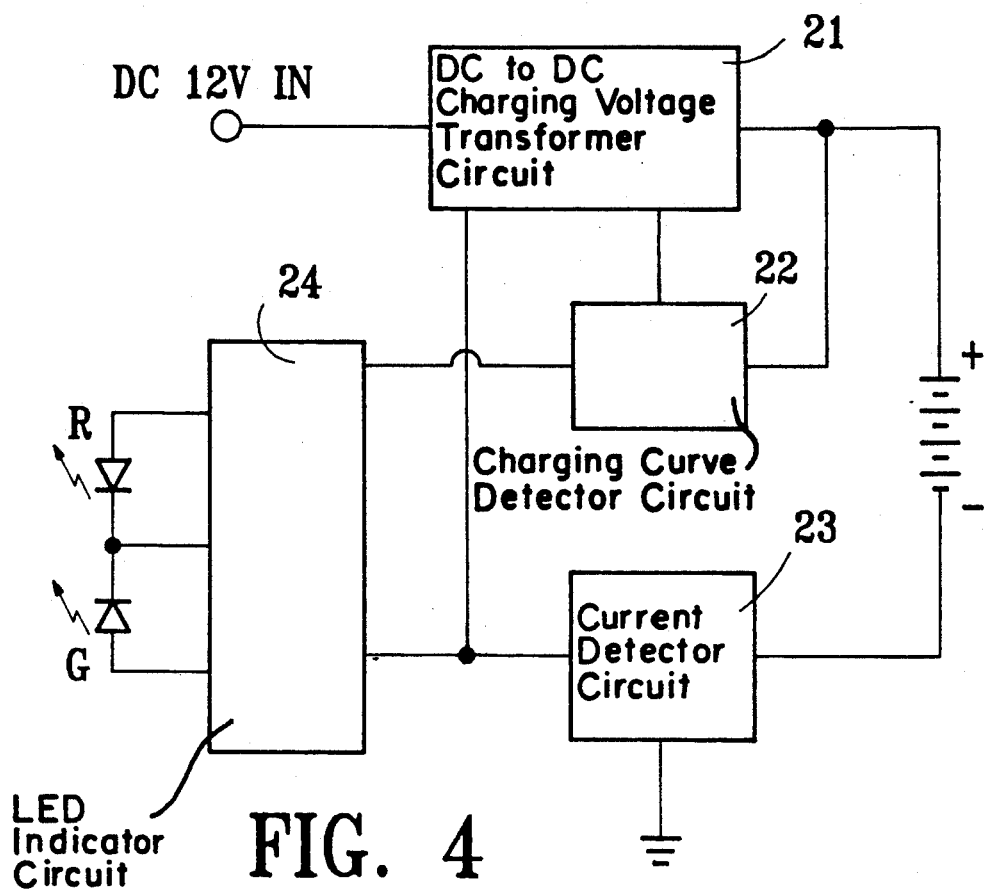
FIG. 4 is a block diagram for the replaceable cartridge type high speed battery charger according to the present invention.

Reference will now be made to FIG. 4 which depicts a block diagram of the charger circuit according to the present invention. The charger according to the present invention can be used for nickel-cadmium batteries of different voltages. Pulse current is applied to prevent damage to each battery and prolong the service life of the battery. Since a temperature rise and a voltage drop occurs when a battery is charged to a certain voltage, the negative voltage gradient is used to determine whether the battery has been saturated, and consequently to cut off the charger circuit accordingly and light an indicator to indicate completion of charging. Therefore, the charger circuit for the charger according to the present invention includes:

1. A DC to DC charging voltage transformer circuit (21): PWM (pulse width modulation) switching transformer circuit is used. It is characterized by high efficiency and low heat emission The transformer circuit is controlled by a delta-star circuit and a current detector circuit. Such transformer circuit can be cut off by the delta-star circuit, and its output voltage is controlled by the current detector circuit.

2. A delta-star negative charging curve detector circuit (22): Upon charging of nickel-cadmium battery under normal condition, the charging time is proportional to voltage, for which a positive characteristic curve occurs. When a certain voltage (turning point) is reached during the charging, the characteristic curve becomes negative due to temperature rise at the battery Therefore, the longer the time, the lower the voltage. This charging curve detector circuit is designed to detect such a voltage drop, and to determine whether the battery is in the negative curve after an elapse of time. If yes, it turns off the transformer circuit to discontinue charging.

3. A Current detector circuit (23): The current detector circuit detects charging current to the nickel-cadmium battery, and provide the transformer circuit with an output. If current is too low, the current detector circuit can cause the transformer circuit increase the voltage in order to provide a sufficient current so that a charger circuit having a constant current supply is formed.

4. An LED indicator circuit (24): An R&G LED is orange (both red and green are lit) when the battery is in an open circuit, or there is no battery, or there is a poor contact. It is red when charging current exists, indicating charging is in process It turns to green when the battery is saturated and the charger circuit is turned of, indicating the charging is completed, and the battery is ready for use.

Figure 5:
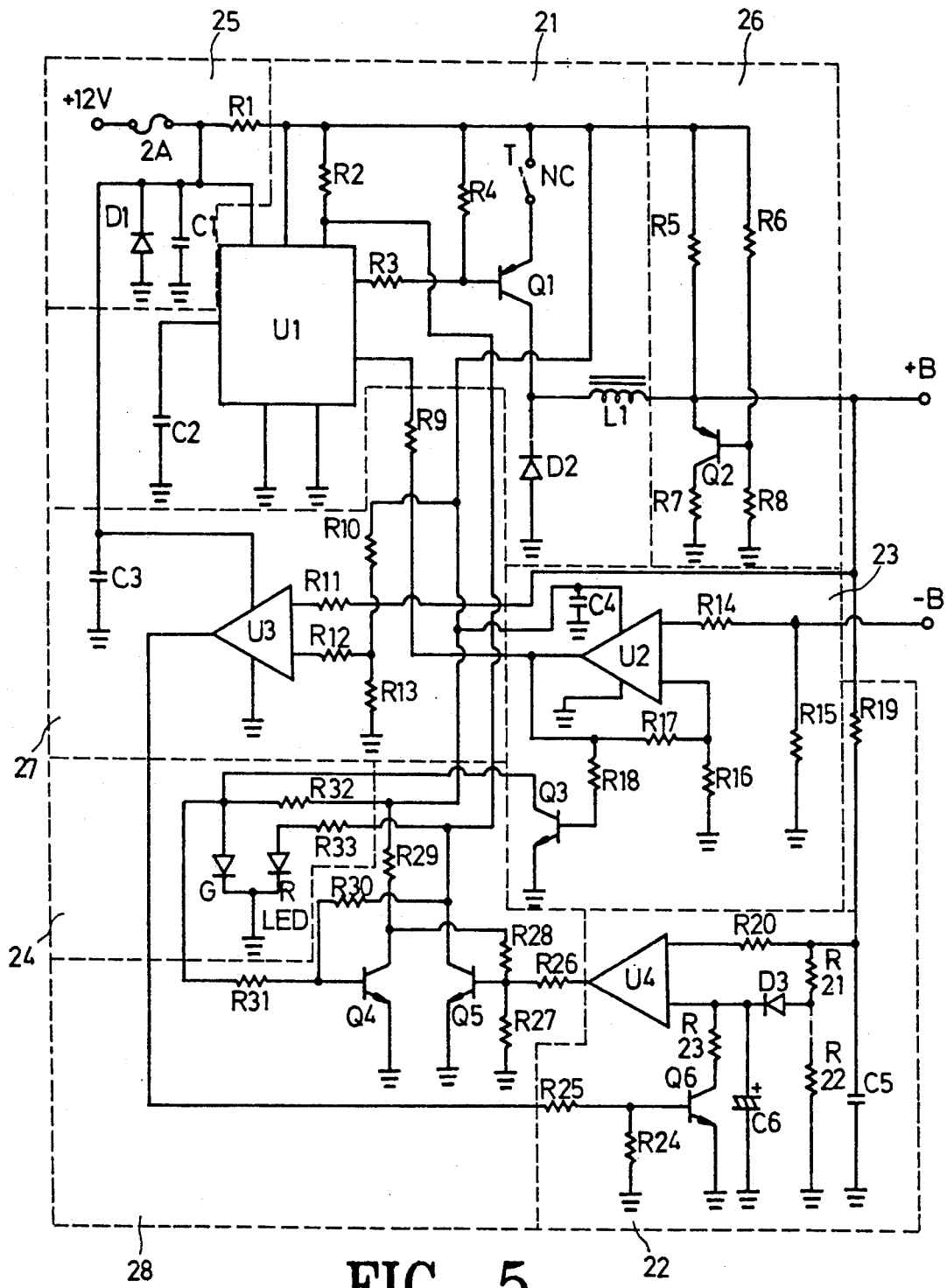
FIG. 5 is a circuit diagram of the replaceable cartridge type high speed battery charger according to the present invention.

Please refer to FIG. 5 for a circuit diagram of the charger according to the present invention, which is described below 1. A DC to DC charging voltage transformer circuit (21): It is composed of an integrated circuit U1, a resistor R2, a capacitor C2, two resistors R3 and R4, a transistor Q1, a diode D2, a coil L1, and a thermal switch T. The integrated circuit PWM (pulse width modulation) IC, oscillation of which is determined by the capacitor C2, and output from which is from its first pin via the resistor R3 to the base B of the transistor Q1, while the resistor R4 provides the transistor Q1 a bias for amplification of current. Current is led in from the emitter E of the transistor Q1, output from which is from the collector C of the transistor Q1 to the diode D2 and coil L1 for rectification and filtration to become a direct current which is then connected to the positive pole of the battery. The thermal switch T is turned to off position to open the circuit as a protection against overheating whenever the temperature of the transistor Q1 is too high.

2. Input Power Supply Circuit (25): It is composed of a fuse, a capacitor C1, a diode D11, and a resistor R1. The fuse and the diode D1 form a reverse voltage protection circuit which can have the diode on to give a large current to burn out the fuse when opposite polarity of input power source is encountered. The capacitor C1 serves as a filter to stabilize voltage. The resistor is an overcurrent protection resistor for dc to dc, and, together with the integrated circuit U1, provides an overcurrent protection.

3. Battery Discharge Circuit (26): It is composed of resistors R5, R6, R7, and R8, and a transistor Q2. If there is no potential at the resistors R5 and R6 (no power input), the transistor Q2 is on following the bias, the battery discharges through the transistor Q2 and the resistor R7. When there is a potential at the resistors R5 and R6, the opposite situation occurs.

4. Current Detector Circuit (23): It is composed of resistors R14, R15, R16 and R17, an amplifier U2, and a capacitor C4. When current is passing through the resistor R15, there is a terminal voltage, which is then amplified by the amplified U2, sent to the fifth pin of the integrated circuit U1 via the resistor R9 as a power supply of a constant current. The resistors R16 and R17 determine magnitude of the charging current, and the capacitor C4 serves as a power source shunt of the amplifier U2.

5. Voltage Comparison Circuit (27): It is composed of resistors R10, R11, R12 and R13, a comparator U3 and a capacitor C3. The resistors R10 and R11 serve as a voltage divider, the resistor R11 is connected to the positive pole of the battery, and the comparator U3 makes voltage comparison and determine for continuity or discontinuity of the battery for judgment made by a control circuit.

6. Delta-Star Detector Circuit (22): It is composed of resistors R19, R20, R21, R22, R23, R24 and R25, two capacitors C5 and C6, a diode D3, a transistor Q6, and a discriminator U4. The capacitor C6 serves as a memory of voltage so as the discriminator U4 can judge whether the voltage of the battery has changed, or has reached the required gradient of changing or not. The result of such discrimination is sent to the control circuit. The resistor R2 and the capacitor C6 form a discharge circuit, and charge at the capacitor C6 is discharged according to the level of voltage received by the resistors R24 and R25. When the battery is fully charged, the battery is removed, and the charge in the capacitor C6 should be discharged before another battery is charged.

7. Control Circuit (28): For control of charging, it is composed of resistors R26, R27, R28, R29, R30 and R31, and two transistors Q4 and Q5. When current is passing through the resistor R26, the transistor Q5 is on and the transistor Q4 is disabled to become a R-S flip flop. On the contrary, when current is passing through the resistor R31, the transistor Q4 is on, and the transistor Q5 is off. By this way, the charging circuit is controlled to begin charging or discontinue charging.

8. LED Display Circuit (24): It is composed of two resistors R32 and R33, and a LED. The LED can display red, green or orange light to indicate charging condition according to signal from the related circuit.

As described above, the replaceable cartridge type high speed nickel-cadmium battery charger according to the present invention has the following merits:

(1) Replaceable charger cartridges to fit batteries of different sizes/configurations for different electric devices.

(2) Both a.c. and d.c. are applicable: AC 220V, or AC 110V, or DC 12V.

(3) High speed charging, charging can be completed within a half hour.

(4) Three-color indicator: Orange as waiting, red as charging in process, and green as battery is ready for use.

(5) Automatic discharging to erase memory of voltage for last battery charged.

(6) Automatic discrimination for charging condition to cut off power source automatically in order to prevent overcharging which may damage battery.

(7) Completed with different protection circuits, including short-circuit, overload, and overheating.

(8) Unique switching type charging circuit which provides high efficiency and low heat emission.

(9) Application of SMT technology for light and compact size with high reliability at high production capacity.

(10) No microprocessor is used for discrimination, eliminating erroneous functions which may occur to damage battery.

(11) Twin d.c. power source sockets to fit plug of different specifications.

(12) Light and compact, with elegant appearance.

Many changes and modifications in the above described embodiment of the invention can, of course, be carried out without departing from the scope thereof. Accordingly, to promote the progress in science and the useful arts, the on is disclosed and is intended to be limited by the scope of the following claims.

What is claimed is:

1. A replaceable cartridge type high speed nickel cadmium battery charger comprising:
   a base having a hollow interior space for selectively receiving one of a plurality of replaceable charger cartridges and a round hole in a middle portion thereof;
   circuit board means mounted within the hollow interior space of the base;
   an upper cover having a plurality of convectional radiation holes on the left side of its upper surface, an LED indicator adjacent its left edge, and a replaceable charger cartridge chamber on the right side; and
   at least one replaceable charger cartridge including a battery chamber, two conductive metal plates at a front side and a lock hole in the bottom thereof, said charger cartridge can be placed in and removed from the charger cartridge chamber and locked to the base by means of a bolt passing through the round hole in the middle portion of the base and into the lock hole.

2. A replaceable cartridge type high speed nickel cadmium battery charger as claimed in claim 1, further comprising a plurality of replaceable charger cartridges designed in different configurations to fit rechargeable batteries of different size/configurations for different electric devices.

3. A replaceable cartridge type high speed nickel cadmium battery charger as claimed in claim 1, further including a pair of d.c. current input sockets installed between the base and the front side of the upper cover for connecting power adapters of different specifications and to permit application of an a.c. power source.

4. A replaceable cartridge type high speed nickel cadmium battery charger as claimed in claim 3, further including means for connecting a d.c. power source to the pair of d.c. current input sockets.

5. A replaceable cartridge type high speed nickel cadmium battery charger as claimed in claim 1, wherein the circuit board means includes a charging voltage transformer circuit comprising a high efficiency and low heat emission pulse width modulation switching transformer circuit controlled by a delta-star circuit and a current detector circuit such that power can be cut off to the charging voltage transformer circuit by the delta-star circuit, and output voltage from the charging voltage transformer circuit is controlled by the current detector circuit.

6. A replaceable cartridge type high speed nickel cadmium battery charger as claimed in claim 1, wherein the circuit board means further includes a delta-star negative charging curve detector circuit for detecting when an indicating voltage is reached during charging, which is indicated when a characteristic curve becomes negative due to a temperature rise at a battery being charged, and for turning off a transformer circuit to discontinue charging upon sensing the indicating voltage.

7. A replaceable cartridge type high speed nickel cadmium battery charger as claimed in claim 1, wherein the circuit board means includes a current detector circuit to detect charging current applied to a nickel cadmium battery and to provide a transformer circuit with an output such that, if current is too low, said current detector circuit causes the transformer circuit to increase its output voltage in order to provide a sufficient current so as to maintain a substantially constant current supply.

8. A replaceable cartridge type high speed nickel cadmium battery charger as claimed in claim 1, wherein the circuit board means further comprises an LED indicator circuit which includes said LED indicator, said LED indicator circuit controlling the visual color of said LED indicator such that the LED indicator is orange when a battery is in an open circuit; red when charging current exists, indicating charging is in process; and green when the battery being charged is saturated, indicating the charging is completed, and the battery is ready for use.

* * * * *